(12) United States Patent
Horn et al.

(10) Patent No.: US 12,075,426 B2
(45) Date of Patent: Aug. 27, 2024

(54) DYNAMIC DOWNLINK WAVEFORM AND DECODER UE CAPABILITIES

(71) Applicant: QUALCOMM Incorporated, San Diego, CA (US)

(72) Inventors: Idan Michael Horn, Hod Hasharon (IL); Assaf Touboul, Netanya (IL); Shay Landis, Hod Hasharon (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 17/200,147

(22) Filed: Mar. 12, 2021

(65) Prior Publication Data
US 2022/0295455 A1   Sep. 15, 2022

(51) Int. Cl.
*H04W 72/04*   (2023.01)
*H04W 52/02*   (2009.01)
*H04W 72/23*   (2023.01)

(52) U.S. Cl.
CPC ........... *H04W 72/23* (2023.01); *H04W 52/02* (2013.01)

(58) Field of Classification Search
CPC .............................. H04W 52/02; H04W 72/042
USPC ........................................................ 370/329
See application file for complete search history.

(56) References Cited

U.S. PATENT DOCUMENTS

| | | | | |
|---|---|---|---|---|
| 2011/0211622 | A1* | 9/2011 | Wang | H04B 7/0408 375/220 |
| 2014/0006612 | A1* | 1/2014 | Fallon | H04L 43/091 709/224 |
| 2015/0092879 | A1* | 4/2015 | Mansour | H03M 5/18 375/286 |
| 2019/0260623 | A1* | 8/2019 | Li | H04L 27/2627 |
| 2019/0364492 | A1* | 11/2019 | Azizi | H04W 4/021 |
| 2020/0260376 | A1* | 8/2020 | Islam | H04W 52/0212 |

FOREIGN PATENT DOCUMENTS

WO   WO-2020193840 A1 * 10/2020

OTHER PUBLICATIONS

International Search Report and Written Opinion—PCT/US2022/070479—ISA/EPO—May 12, 2022.

* cited by examiner

*Primary Examiner* — Christopher M Crutchfield
*Assistant Examiner* — Jean F Voltaire
(74) *Attorney, Agent, or Firm* — Norton Rose Fullbright US LLP

(57) ABSTRACT

Wireless communication techniques for supporting, selecting, and using multiple waveforms and/or multiple decoders for downlink wireless communication are discussed. A UE may transmit to a base station an indication of one or more downlink waveforms or decoders supported by the UE. The UE may also transmit to the base station an indication of power consumption associated with at least one of the one or more downlink waveforms or decoders. The UE may receive from the base station an indication of a waveform or decoder, based on the indication of power consumption, to use for downlink wireless communication.

36 Claims, 10 Drawing Sheets

DYNAMIC DOWNLINK WAVEFORM AND DECODER UE CAPABILITIES

TECHNICAL FIELD

Aspects of the present disclosure relate generally to wireless communication systems, and more particularly, to techniques for supporting, selecting, and using multiple waveforms and/or multiple decoders for downlink wireless communication. Some features may enable and provide improved communications, including higher data rates, higher capacity, better spectral efficiency, and higher reliability, and lower device power.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio-frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication performed by a UE is provided. For example, a method can include the UE transmitting, to a base station, an indication of one or more downlink waveforms or decoders supported by the UE. The method can also include the UE transmitting, to the base station, an indication of power consumption associated with at least one of the one or more downlink waveforms or decoders. The method may further include the UE receiving, from the base station, an indication of a waveform or decoder, based on the indication of power consumption, to use for downlink wireless communication.

In another aspect of the disclosure, a UE is provided. The UE may include at least one processor. The UE may also include at least one memory coupled to the at least one processor. The at least one processor can be configured to transmit an indication of one or more downlink waveforms or decoders supported by the UE. The at least one processor can be further configured to transmit an indication of power consumption associated with at least one of the one or more downlink waveforms or decoders. The at least one processor can also be configured to receive an indication of a waveform or decoder, based on the indication of power consumption, to use for downlink wireless communication.

In one aspect of the disclosure, a method for wireless communication performed by a base station is provided. For example, a method can include receiving an indication of one or more downlink waveforms or decoders supported by a UE. The method can also include receiving an indication of power consumption associated with at least one of the one or more downlink waveforms or decoders. The method may further include the base station transmitting, to the UE, an indication of a waveform or decoder, based on the indication of power consumption, to use for downlink wireless communication.

In another aspect of the disclosure, a base station is provided. The base station may include at least one processor. The base station may also include at least one memory coupled to the at least one processor. The at least one processor can be configured to receive an indication of one or more downlink waveforms or decoders supported by a UE. The at least one processor can also be configured to receive an indication of power consumption associated with at least one of the one or more downlink waveforms or decoders. The at least one processor may be further configured to transmit an indication of a waveform or decoder, based on the indication of power consumption, to use for downlink wireless communication.

According to one aspect of the disclosure, a method for wireless communication performed by a UE is provided. For example, a method can include transmitting, to a base station, a request to use a first waveform during a first time period for downlink wireless communication. The method can also include receiving, from the base station, a response to the request that includes an indication of a selected waveform to use during the first time period for the downlink wireless communication.

According to another aspect of the disclosure, a UE is provided. The UE may include at least one processor. The UE may also include at least one memory coupled to the at least one processor. The at least one processor can be configured to transmit, to a base station, a request to use a first waveform during a first time period for downlink wireless communication. The at least one processor can also be configured to receive, from the base station, a response to the request that includes an indication of a selected waveform to use during the first time period for the downlink wireless communication.

According to one aspect of the disclosure, a method for wireless communication performed by a base station is provided. For example, a method can include receiving, from a UE, a request to use a first waveform during a first time period for downlink wireless communication. The method can also include transmitting, to the UE, a response to the request that includes an indication of a selected waveform to use during the first time period for the downlink wireless communication.

According to another aspect of the disclosure, a base station is provided. The base station may include at least one processor. The base station may also include at least one memory coupled to the at least one processor. The at least one processor can be configured to receive, from a UE, a request to use a first waveform during a first time period for downlink wireless communication. The at least one processor can also be configured to transmit, to the UE, a response to the request that includes an indication of a selected waveform to use during the first time period for the downlink wireless communication.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

DETAILED DESCRIPTION

Figure 1:
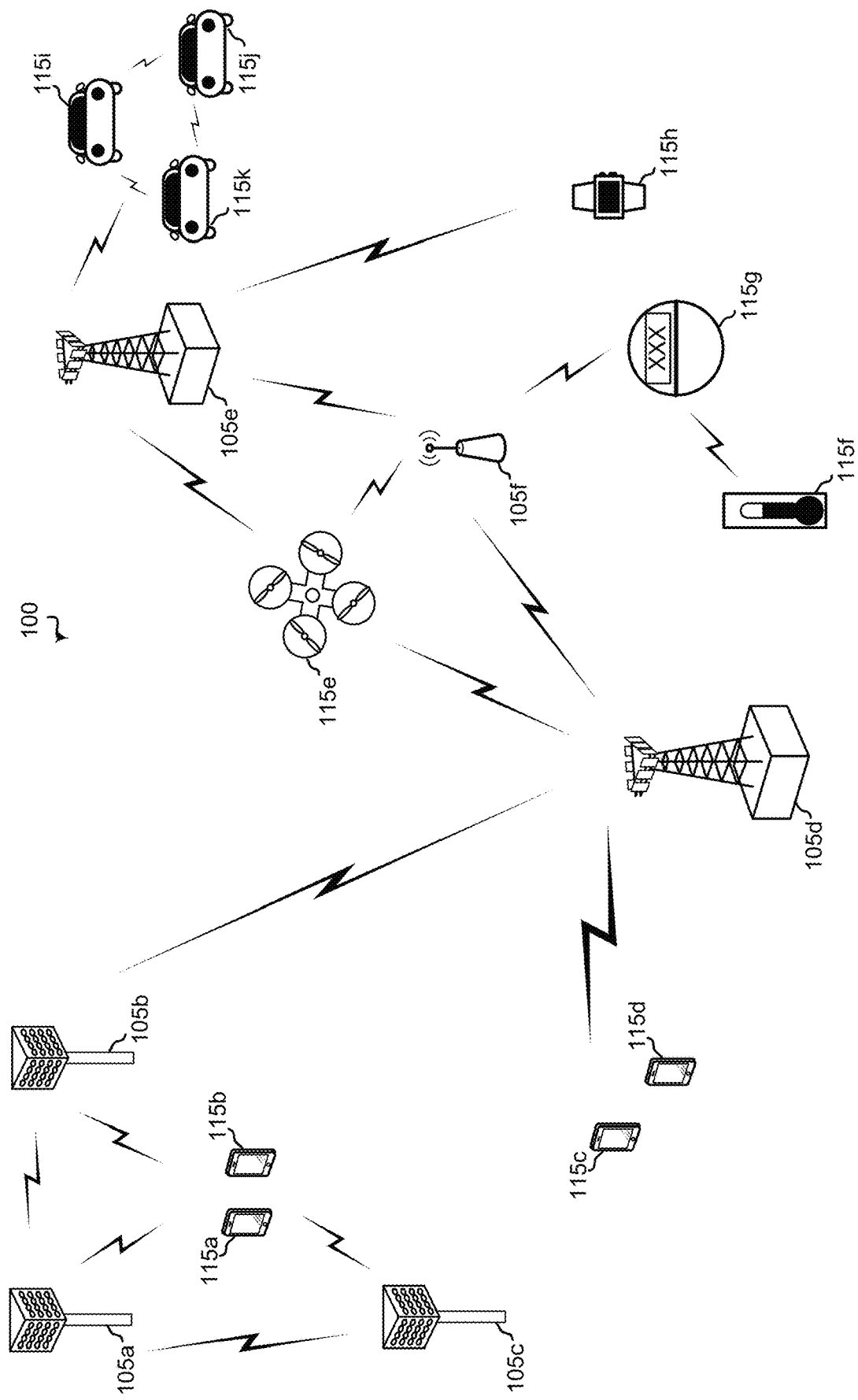
FIG. 1 is a diagram illustrating details of an example wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgment in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspect. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
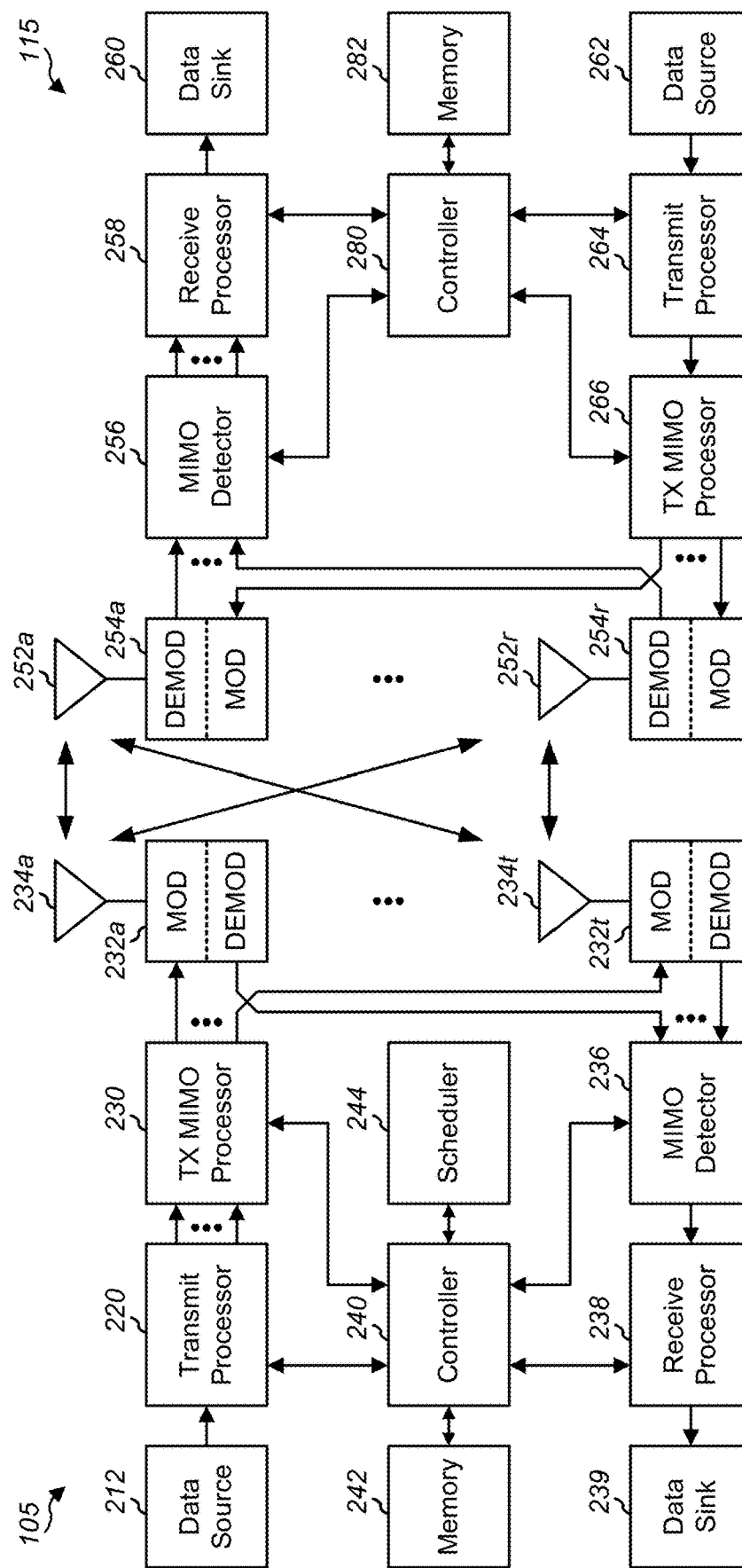
FIG. 2 is a block diagram illustrating examples of a base station and a user equipment (UE) according to some aspects of the present disclosure.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 3 through 6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In some aspects, a critical feature of a UE may be power consumption associated with the UE, such as UE power consumption when performing downlink wireless communication. According to some aspects, it may be desirable to reduce, or at least not increase, power consumption associated with a UE as additional features and capabilities are added to the UE.

Many factors may present challenges to the management of UE power. For example, as wireless communication supports higher bandwidth signals, higher data rates, and/or higher frequencies, such as mmWave frequencies and beyond, UE power management may become more challenging because an increase in frequency operation, bandwidth, and/or data rate associated with wireless communication typically also requires an increase in power. In addition, although the number of antennas in a UE antenna array may be increased, e.g., to improve spectral efficiency, without increasing the physical size of the antenna array as wireless communication moves to higher frequencies, more antennas typically require more power.

One wireless communication feature that may influence how much power is consumed by a UE during downlink wireless communication is the waveform used by the UE for downlink wireless communication. For example, the power consumed by various components of a UE, such as antennas, analog-to-digital converters (ADCs), digital front ends (DFEs), and/or baseband processors, may be at least partially a function of the waveform used for downlink wireless communication. Traditionally, an orthogonal frequency-division multiplexing-based (OFDM-based) waveform has been used for wireless communication because, in certain aspects, OFDM-based waveforms may yield high throughput, channel robustness, e.g., efficient wireless communication in the presence of a fading channel, and other advantageous wireless communication features.

Another wireless communication feature that may influence how much power is consumed by a UE during downlink wireless communication is the decoder used by the UE for downlink wireless communication. Typically, a UE uses only one type of decoder to receive a particular type of information, e.g., to receive data over a data channel, such as the PDSCH.

As wireless communication continues to move to higher frequencies and support higher bandwidth signals and higher data rates, other waveforms and/or decoders may turn out to be more power efficient in certain aspects. For example, beam management schemes may be used to improve wireless communication as wireless communication moves to higher frequencies. According to some aspects, with good beam management, channel dispersion may be reduced such that the channel's frequency response may become almost flat, thereby making other waveforms available for use for wireless communication, such as waveforms that yield less overall power consumption by the UE when performing downlink wireless communication. Additionally, at higher frequencies, such as mmWave frequencies and beyond, TDM-based wireless communication may be utilized, thereby making simpler waveforms, such as single-carrier waveforms, available for use for wireless communication.

Aspects of this disclosure may provide techniques for supporting, selecting, and using multiple waveforms and/or multiple decoders for downlink wireless communication. For example, a UE may support multiple waveforms and/or multiple decoders for downlink wireless communication. Each waveform and/or decoder may be associated with a particular amount of power consumption and/or a particular performance level. In some aspects, the waveform and/or decoder selected and used for downlink wireless communication may be the waveform and/or decoder that yields the lowest power, the best performance, or the best combination of power and performance. In additional aspects, a UE may inform a base station which waveform is recommended for use for downlink wireless communication for a particular period of time. According to some aspects, the base station may consider the UE's recommendation and may inform the UE which waveform should be used for downlink wireless communication for that particular period of time, which may be the waveform recommended by the UE or a different waveform. The waveform recommended by the UE and/or selected by the base station for downlink wireless communication may be the waveform that yields the lowest power, the best performance, or the best combination of power and performance.

Figure 3:
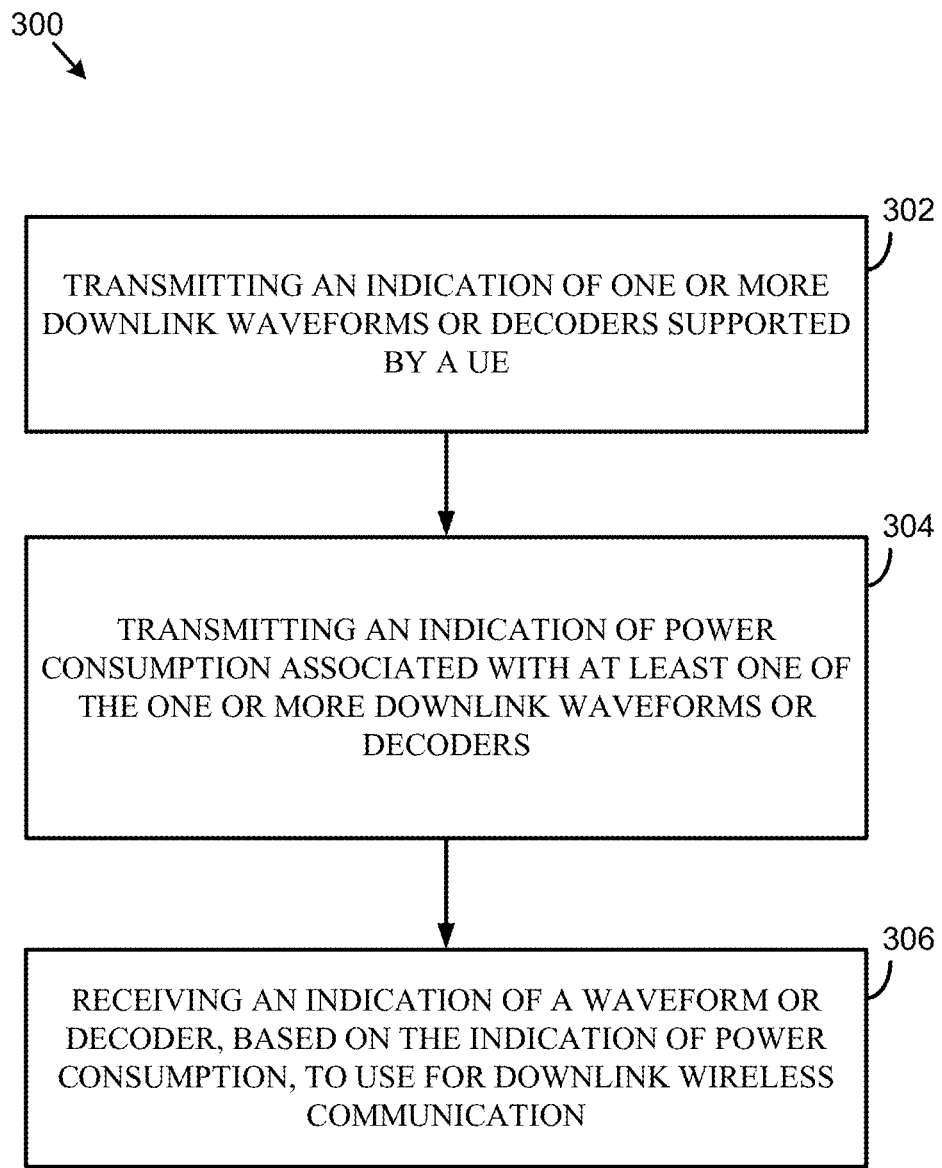
FIG. 3 is a diagram illustrating a method for dynamic utilization of multiple waveforms and/or multiple decoders for downlink wireless communication according to some aspects of the present disclosure.

FIG. 3, as an example, shows a diagram illustrating a method for dynamic utilization of multiple waveforms and/or multiple decoders for downlink wireless communication according to some aspects of the present disclosure. Aspects of method 300 may be implemented with various other aspects of this disclosure described with respect to FIGS. 1-2, 4, and 7-9, such as a mobile device/UE. For example, with reference to FIG. 2, controller/processor 280 of UE 115 may control UE 115 to perform method 300.

FIG. 3 illustrates a method 300 that may be performed by a UE, such as a UE 115. At block 302 of method 300, a UE, such as UE 115, may transmit, e.g., to a base station, an indication of one or more downlink waveforms or decoders supported by the UE. According to some aspects, the indication of one or more downlink waveforms or decoders supported by the UE may include a single indication. In additional aspects, the indication of one or more downlink waveforms or decoders supported by the UE may include multiple indications. As an example, in some aspects, the indication of one or more downlink waveforms or decoders supported by the UE may include an indication of one or more downlink waveforms supported by the UE. In additional aspects, the indication of one or more downlink waveforms or decoders supported by the UE may include an indication of one or more decoders supported by the UE. In yet additional aspects, the indication of one or more downlink waveforms or decoders supported by the UE may include an indication of one or more downlink waveforms supported by the UE and an indication of one or more decoders supported by the UE.

In some aspects, the indication of one or more downlink waveforms or decoders supported by the UE may take on various forms. For example, in some aspects, the indication of one or more downlink waveforms or decoders supported by the UE may include a list or table that identifies the one or more downlink waveforms supported by the UE. According to some aspects, the one or more downlink waveforms shown at block 302 may include an OFDM waveform, a single-carrier waveform, a SC-FDMA waveform, a CDMA waveform, and/or other waveforms currently known or soon developed. In other words, the foregoing waveforms expressly mentioned are only examples of the many waveforms that may be included in the one or more downlink waveforms shown at block 302. Accordingly, a person of ordinary skill in the art would readily recognize that the one or more downlink waveforms mentioned at block 302 may include various other waveforms not expressly listed in this disclosure.

According to some aspects, the indication of one or more downlink waveforms or decoders supported by the UE may take on additional various forms. For example, in some aspects, the indication of one or more downlink waveforms or decoders supported by the UE may include a list or table that identifies the one or more decoders supported by the UE. In some aspects, the one or more decoders shown at block 302 may include a low-density parity-check (LDPC) decoder, a Reed-Solomon decoder, a multilevel coding (MLC) decoder, a Bose-Chaudhuri-Hocquenghem (BCH) decoder, a Viterbi decoder, a polar code-based decoder, a turbo code-based decoder, and/or other decoders currently known or soon developed. In other words, the foregoing decoders expressly mentioned are only examples of the many decoders that may be included in the one or more decoders shown at block 302. Accordingly, a person of ordinary skill in the art would readily recognize that the one or more decoders mentioned at block 302 may include various other decoders not expressly listed in this disclosure.

At block 304 of method 300, a UE may transmit, e.g., to a base station, an indication of power consumption associated with at least one of the one or more downlink waveforms or decoders. According to some aspects, the indication of power consumption associated with at least one of the one or more downlink waveforms or decoders may include a single indication. In additional aspects, the indication of power consumption associated with at least one of the one or more downlink waveforms or decoders may include multiple indications. As an example, in some aspects, the indication of power consumption associated with at least one of the one or more downlink waveforms or decoders may include an indication of power consumption associated with at least one of the one or more downlink waveforms. In additional aspects, the indication of power consumption associated with at least one of the one or more downlink waveforms or decoders may include an indication of power consumption associated with at least one of the one or more decoders. In yet additional aspects, the indication of power consumption associated with at least one of the one or more downlink waveforms or decoders may include an indication of power consumption associated with at least one of the one or more downlink waveforms and an indication of power consumption associated with at least one of the one or more decoders.

According to some aspects, the indication of power consumption associated with at least one of the one or more downlink waveforms or decoders may take on various forms. For example, in some aspects, the indication of power consumption associated with at least one of the one or more downlink waveforms or decoders may include a list or table that provides the individual power consumption values associated with each of at least one of the one or more downlink waveforms. Similarly, in additional aspects, the indication of power consumption associated with at least one of the one or more downlink waveforms or decoders may include a list or table that provides the individual power consumption values associated with each of at least one of the one or more decoders.

In some aspects, the indication of power consumption associated with at least one of the one or more downlink waveforms or decoders may provide additional details regarding power consumption associated with supported waveforms. For example, in some aspects, the indication of power consumption associated with at least one of the one or more downlink waveforms or decoders may include an indication of power consumed by each of one or more components of the UE for each of the at least one of the one or more downlink waveforms. As an example, according to some aspects, for each of at least one waveform indicated as supported by the UE, the power consumption indication associated with a waveform may include one or more indications of power consumed by one or more digital front-end (DFE) components and/or one or more baseband processing components. In some aspects, the additional one or more power indications may indicate power associated with a decoder, a demodulator, equalization processing, FFT processing, timing processing, filtering, and/or other well-known components of a UE.

According to some aspects, a UE may also transmit to a base station information regarding other characteristics of supported waveforms. For example, in some aspects, a UE may also transmit, e.g., to a base station, an indication of performance associated with at least one of the one or more downlink waveforms. According to some aspects, the indication of performance associated with at least one of the one or more downlink waveforms may include a list or table that provides the individual performance values associated with each of at least one of the one or more downlink waveforms. In some aspects, performance, as disclosed herein, may refer to throughput, ratios that account for signal and noise variations, latency, and/or other well-known wireless communication performance indicators.

Similarly, in additional aspects, a UE may also transmit to a base station information regarding other characteristics of supported decoders. For example, in some aspects, a UE may also transmit, e.g., to a base station, an indication of performance associated with at least one of the one or more decoders. According to some aspects, the indication of performance associated with at least one of the one or more decoders may include a list or table that provides the individual performance values associated with each of at least one of the one or more decoders.

In some aspects, the indicated power and/or performance associated with a first waveform may be normalized to a corresponding power and/or performance of a particular second waveform. As one example, the indicated one or more downlink waveforms supported by a UE may include at least an OFDM-based waveform and a single-carrier-based waveform. In the example, the OFDM-based waveform may be the reference waveform. In such an example, the indicated power associated with the single-carrier-based waveform may be a power value that is normalized to the power of the OFDM-based waveform. Continuing with the example, the indicated performance associated with the single-carrier-based waveform may be a performance value that is normalized to the performance of the OFDM-based waveform.

Similarly, in some additional aspects, the indicated power and/or performance associated with a first decoder may be normalized to a corresponding power and/or performance of a particular second decoder. As one example, the indicated one or more decoders supported by a UE may include at least an LDPC-based decoder and a turbo code-based decoder. In the example, the LDPC-based decoder may be the reference decoder. In such an example, the indicated power associated with the turbo code-based decoder may be a power value that is normalized to the power of the LDPC-based decoder. Continuing with the example, the indicated performance associated with the turbo code-based decoder may be a performance value that is normalized to the performance of the LDPC-based decoder.

According to additional aspects, the indicated powers and/or performances associated with waveforms may be normalized to one of a variety of wireless communication parameters. For example, in some aspects, the indicated individual power values and/or individual performance values associated with different waveforms, e.g., as shown at block 304, may be power values and/or performance values that are normalized to a particular throughput, such as 100 Mbps. In other words, focusing on power, the indicated power values associated with different waveforms may be the power values that are needed to achieve a particular throughput, such as 100 Mbps, for each particular waveform. Other parameters to which indicated powers and/or performances associated with waveforms may be normalized include a particular modulation and coding scheme (MCS), a particular constellation, a particular allocation of frequency and/or time resources, a particular signal to interference plus noise ratio (SINR), a particular delay spread, and/or other well-known wireless communication parameters.

Similarly, in some additional aspects, the indicated powers and/or performances associated with decoders may be normalized to one of a variety of wireless communication parameters. For example, in some aspects, the indicated individual power values and/or individual performance values associated with different decoders, e.g., as shown at block 304, may be power values and/or performance values that are normalized to a particular throughput, such as 100 Mbps. In other words, focusing on power, the indicated power values associated with different decoders may be the power values that are needed to achieve a particular throughput, such as 100 Mbps, for each particular decoder. Other parameters to which indicated powers and/or performances associated with decoders may be normalized include a particular MCS, a particular constellation, a particular allocation of frequency and/or time resources, a particular SINR, a particular delay spread, and/or other well-known wireless communication parameters.

According to some aspects, the indicated powers and/or performances that are associated with waveforms and/or decoders may also be normalized to a particular type of communication channel. For example, in some aspects, at least one of the indication of the power consumption associated with the at least one of the one or more downlink waveforms or decoders, the indication of the performance associated with the at least one of the one or more downlink waveforms, or the indication of the performance associated with the at least one of the one or more decoders may be associated with at least one of a flat wireless communication channel or a fading wireless communication channel.

In some aspects, the indicated powers and/or performances that are associated with waveforms and/or decoders may be determined dynamically. For example, a UE may transmit to a base station a first indication of powers and/or performances associated with waveforms and/or decoders. The first indication may include power values and performance values determined by the UE at a first time instant. At a later time, the UE may transmit to the base station a second indication of powers and/or performances associated with waveforms and/or decoders. The second indication may include power values and performance values determined by the UE at a second time instant that is later in time than the first time instant.

At block 306 of method 300, a UE may receive, e.g., from a base station, an indication of a waveform or decoder, based on the indication of power consumption, to use for downlink wireless communication. According to some aspects, the indication of a waveform or decoder to use for downlink wireless communication may include a single indication. In additional aspects, the indication of a waveform or decoder to use for downlink wireless communication may include multiple indications. As an example, in some aspects, the indication of a waveform or decoder to use for downlink wireless communication may include an indication of a waveform to use for downlink wireless communication. In additional aspects, the indication of a waveform or decoder to use for downlink wireless communication may include an indication of a decoder to use for downlink wireless communication. In yet additional aspects, the indication of a waveform or decoder to use for downlink wireless communication may include an indication of a waveform to use for downlink wireless communication and an indication of a decoder to use for downlink wireless communication.

As shown at block 306, in some aspects, the received indication of the waveform or decoder to use for downlink wireless communication may be based on the transmitted indication of power consumption associated with at least one of the one or more downlink waveforms or decoders, e.g., as shown at block 304. For example, a base station that transmitted the UE-received indication of the waveform or decoder to use for downlink wireless communication may have transmitted the indication based, at least in part, on the indication of the power consumption associated with at least one of the one or more downlink waveforms or decoders that the base station received from the UE. As an example, the base station may select for downlink wireless communication a waveform that yields the lowest power or that is not the waveform associated with the highest power consumption. As another example, the base station may select for downlink wireless communication a decoder that yields the lowest power or that is not the decoder associated with the highest power consumption.

In some aspects, a waveform may be selected for downlink wireless communication based on the performances associated with the supported waveforms. In particular, according to some aspects, the received indication of the waveform or decoder to use for downlink wireless communication, e.g., as shown at block 306, may be based on the transmitted indication of the performance associated with the at least one of the one or more downlink waveforms. For example, a base station that transmitted the UE-received indication of the waveform or decoder to use for downlink wireless communication may have transmitted the indication based, at least in part, on the indication of the performance associated with the at least one of the one or more downlink waveforms that the base station received from the UE. As an example, the base station may select for downlink wireless communication a waveform that yields the best performance metric or that is not the waveform associated with the worst performance metric.

According to some aspects, a waveform may be selected for downlink wireless communication based, at least in part, on at least one of powers or performances associated with the supported waveforms. For example, as shown at block 306, in some aspects, the received indication of the waveform or decoder to use for downlink wireless communication may be based on the transmitted indication of power consumption associated with at least one of the one or more downlink waveforms or decoders, irrespective of the performances associated with the supported waveforms. In additional aspects, e.g., as described in the previous paragraph, the received indication of the waveform or decoder to use for downlink wireless communication may be based on the transmitted indication of the performance associated with the at least one of the one or more downlink waveforms, irrespective of the powers associated with the supported waveforms. According to some additional aspects, the received indication of the waveform to use for the downlink wireless communication may be based on at least one of the transmitted indication of power consumption associated with at least one of the one or more downlink waveforms or decoders or the transmitted indication of the performance associated with the at least one of the one or more downlink waveforms.

In some additional aspects, a decoder may be selected for downlink wireless communication based on the performances associated with the supported decoders. In particular, according to some aspects, the received indication of the waveform or decoder to use for downlink wireless communication, e.g., as shown at block 306, may be based on the transmitted indication of the performance associated with the at least one of the one or more decoders. For example, a base station that transmitted the UE-received indication of the waveform or decoder to use for downlink wireless communication may have transmitted the indication based, at least in part, on the indication of the performance associated with the at least one of the one or more decoders that the base station received from the UE. As an example, the base station may select for downlink wireless communication a decoder that yields the best performance metric or that is not the decoder associated with the worst performance metric.

According to some aspects, a decoder may be selected for downlink wireless communication based, at least in part, on at least one of powers or performances associated with the supported decoders. For example, as shown at block 306, in some aspects, the received indication of the waveform or decoder to use for downlink wireless communication may be based on the transmitted indication of power consumption associated with at least one of the one or more downlink waveforms or decoders, irrespective of the performances associated with the supported decoders. In additional aspects, e.g., as described in the previous paragraph, the received indication of the waveform or decoder to use for downlink wireless communication may be based on the transmitted indication of the performance associated with the at least one of the one or more decoders, irrespective of the powers associated with the supported decoders. According to some additional aspects, the received indication of the decoder to use for the downlink wireless communication may be based on at least one of the transmitted indication of power consumption associated with at least one of the one or more downlink waveforms or decoders or the transmitted indication of the performance associated with each of the at least one of the one or more decoders.

In some aspects, waveforms and/or decoders may be utilized for a specific type of downlink wireless communication in which a particular type of information is received and/or transmitted over a particular type of wireless communication channel. For example, information may refer to control information or data information, and a channel may refer to a control channel, e.g., a PDCCH, or a data channel, e.g., a PDSCH. Accordingly, in some aspects, downlink wireless communication disclosed herein may include only communication of control information over a control channel, only communication of data over a data channel, or communication of control information over a control channel and data over a data channel. As a result, in some aspects, the indication of the one or more downlink waveforms supported by the UE, e.g., as shown at block 302, may indicate the one or more downlink waveforms supported by the UE for only one of downlink communication of data over a data channel or downlink communication of control information over a control channel. In addition, according to some aspects, the received indication of the waveform to use for the downlink wireless communication, e.g., as shown at block 306, may be an indication of the waveform to use for only one of downlink communication of data over a data channel or downlink communication of control information over a control channel. Similarly, in some aspects, the indication of the one or more decoders supported by the UE, e.g., as shown at block 302, may indicate the one or more decoders supported by the UE for only one of downlink communication of data over a data channel or downlink communication of control information over a control channel. In addition, according to some aspects, the received indication of the decoder to use for the downlink wireless communication, e.g., as shown at block 306, may be an indication of the decoder to use for only one of downlink communication of data over a data channel or downlink communication of control information over a control channel.

According to some aspects, a UE may receive information from the base station based, at least in part, on at least one of the indication of the waveform to use for the downlink wireless communication or the indication of the decoder to use for the downlink wireless communication. In other words, in some aspects, a UE may use at least one of the indicated waveform or the indicated decoder to perform downlink wireless communication to receive information.

In some aspects, the same hardware of the UE may be used by the UE to support each of the one or more downlink waveforms for the downlink wireless communication. For example, the same UE hardware, such as the same DFE components and/or baseband processing components, may be used to perform downlink wireless communication irrespective of the waveform used by the UE for downlink wireless communication. In some aspects, baseband processing components may include at least a digital signal processor (DSP). Accordingly, in some aspects, a UE providing an indication of supported waveforms may refer to a UE providing an indication of waveforms that can be supported by the UE through reconfiguration of the same hardware for the different waveforms. According to some aspects, the same hardware may be reconfigured by the UE to perform downlink wireless communication based, at least in part, on the waveform that is selected for use for downlink wireless communication. Accordingly, in some aspects, the same hardware of the UE may be used to receive information irrespective of which of the one or more downlink waveforms is indicated by the indication of the waveform or decoder to use for the downlink wireless communication, e.g., as shown at block 306.

According to some aspects, a single report may include at least one of the indication of the one or more downlink waveforms or decoders supported by the UE or the indication of the power consumption associated with the at least one of the one or more downlink waveforms or decoders. In some aspects, the single report may also include at least one of the indication of performance associated with at least one of the one or more downlink waveforms or the indication of performance associated with at least one of the one or more decoders. According to some aspects, the single report may be referred to as a UE capabilities report. In additional aspects, the single report may be referred to as a UE waveform capabilities report, a UE decoder capabilities report, or a UE waveform and decoder capabilities report.

In some aspects, a UE may transmit, e.g., to a base station, the single report during a connection establishment messaging session, such as a control messaging session. For example, the control messaging session may be a radio resource control (RRC) communication session. According to some aspects, during an RRC communication session, a UE may transmit and/or receive RRC messages to and/or from a base station. In some aspects, the RRC communication session, and therefore also the RRC messages, may be utilized to establish a connection between a UE and a base station. According to some aspects, a UE may receive, e.g., from a base station, the indication of the waveform or decoder to use for the downlink wireless communication during the connection establishment messaging session.

A UE may also transmit additional information associated with waveforms and/or decoders. For example, in some aspects, a UE may transmit, e.g., to a base station, an indication of a waveform and decoder pair to be used for the downlink wireless communication. As an example, the UE may transmit the indication of the waveform and decoder pair to be used for the downlink wireless communication when a parameter associated with the downlink wireless communication is greater than, or less than, a threshold for that parameter. In some aspects, the waveform included in the waveform and decoder pair may be a fallback waveform, e.g., a fallback waveform of the indicated one or more downlink waveforms, e.g., as shown at block 302. In additional aspects, the decoder included in the waveform and decoder pair may be a fallback decoder, e.g., a fallback decoder of the indicated one or more decoders, e.g., as shown at block 302. In one example aspect, the indicated waveform and decoder pair may be an OFDM-based waveform and an LDPC-based decoder. According to some aspects, the indication of the waveform and decoder pair to be used for the downlink wireless communication may be transmitted in the single report, e.g., the UE capabilities report.

In some aspects, a parameter associated with the downlink wireless communication may include a delay spread, a velocity, a SINR, a reference signal received power (RSRP), a MCS, a rank value, an allocation of frequency and/or time resources, and/or other well-known wireless communication parameters. According to some aspects, the UE may transmit the indication of the waveform and decoder pair to be used for the downlink wireless communication when multiple parameters associated with the downlink wireless communication are greater than, or less than, respective thresholds for those parameters. In some aspects, a UE may transmit, e.g., to a base station, the thresholds associated with various parameters.

Figure 4:
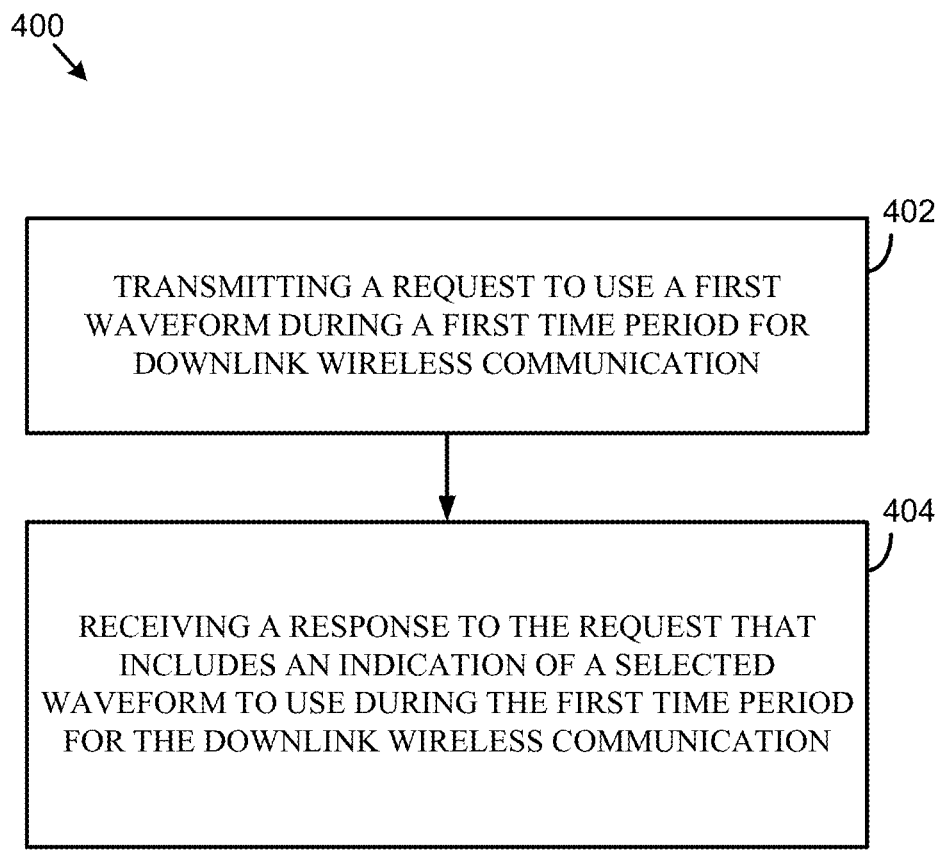
FIG. 4 is a diagram illustrating a method for dynamic selection and use of a waveform for downlink wireless communication according to some aspects of the present disclosure.

FIG. 4, as an example, shows a diagram illustrating a method for dynamic selection and use of a waveform for downlink wireless communication according to some aspects of the present disclosure. Aspects of method 400 may be implemented with various other aspects of this disclosure described with respect to FIGS. 1-3 and 7-9, such as a mobile device/UE. For example, with reference to FIG. 2, controller/processor 280 of UE 115 may control UE 115 to perform method 400.

FIG. 4 illustrates a method 400 that may be performed by a UE, such as a UE 115. At block 402, a UE, such as UE 115, may transmit, e.g., to a base station, a request to use a first waveform during a first time period for downlink wireless communication. As an example, the request may be a request to use a first type of waveform. In some aspects, the first waveform requested or desired for use during the first time period, e.g., as shown at block 402, may include an OFDM-based waveform, a single-carrier waveform, a SC-FDMA waveform, a CDMA waveform, and/or other waveforms currently known or soon developed. In other words, the foregoing waveforms expressly mentioned are only examples of the many waveforms that may be selected as the first waveform shown at block 402. Accordingly, a person of ordinary skill in the art would readily recognize that the first waveform mentioned at block 402 may refer to various other waveforms not expressly listed in this disclosure.

In some aspects, the first time period, e.g., as shown at block 402, may be specified in a variety of ways. For example, in some aspects, the first time period may refer to a number of subframes, a number of slots, a number of symbols, a larger or smaller multiple of a second, and/or other well-known measures of time. Accordingly, in some aspects, the request to use the first waveform during the first time period for downlink wireless communication may include an indication of the waveform to use for the next X number of slots for downlink wireless communication. In some aspects, the value of the first time period may be specified statically, e.g., as a predefined value. For example, in some aspects, the UE may determine the predefined value of the first time period based, at least in part, on information provided in a wireless communication standard or specification. According to some aspects, the value of the first time period determined from the wireless communication standard or specification may be programmed into the UE so that the UE may know the value of the first time period.

In some additional aspects, the value of the first time period may be specified dynamically. For example, in some aspects, the value of the first time period may be transmitted along with the transmitted request to use the first waveform during the first time period for downlink wireless communication. In other words, a UE may transmit an indication of the first time period to the base station. According to some aspects, that first time period indication may include a parameter that specifies a number of slots during which the UE requests use of the first waveform. In some aspects, the indication of the first time period may be transmitted along with the transmitted request to use the first waveform during the first time period for downlink wireless communication, e.g., as part of the same message. In additional aspects, the indication of the first time period may be transmitted separate from the transmitted request to use the first waveform during the first time period for downlink wireless communication, e.g., as part of a different message than the request.

At block 404, a UE may receive, e.g., from a base station, a response to the request that includes an indication of a selected waveform to use during the first time period for the downlink wireless communication. As an example, the response may include an indication of a selected type of waveform. In some aspects, the selected waveform configured for use, e.g., as shown at block 404, may include an OFDM-based waveform, a single-carrier waveform, a SC-FDMA waveform, a CDMA waveform, and/or other waveforms currently known or soon developed. In other words, the foregoing waveforms expressly mentioned are only examples of the many waveforms that may be selected for downlink wireless communication, e.g., as shown at block 404. Accordingly, a person of ordinary skill in the art would readily recognize that the selected waveform mentioned at block 404 may also refer to various other waveforms not expressly listed in this disclosure.

In some aspects, the selected waveform indicated in the response, e.g., as shown at block 404, may be associated with the first waveform indicated in the request, e.g., as shown at block 402. For example, according to some aspects, the selected waveform may be selected, e.g., by a base station, based, at least in part, on the first waveform indicated in the request. As an example, in some aspects, the selected waveform may be the same as the first waveform. In additional aspects, the selected waveform may be a different waveform than the first waveform.

According to some aspects, the first waveform may be selected, e.g., by a UE, based, at least in part, on information included in a report that provides an indication of one or more downlink waveforms supported by the UE. For example, in some aspects, the first waveform may be selected based on any information disclosed above with respect to FIG. 3 that may be included in the aforementioned single report. As described above, the single report may be referred to as a UE capabilities report, a UE waveform capabilities report, a UE decoder capabilities report, or a UE waveform and decoder capabilities report. In other words, according to some aspects, the first waveform may be selected based on at least one of the indication of the one or more downlink waveforms supported by the UE, the indication of the power consumption associated with at least one of the one or more downlink waveforms, or the indication of the performance associated with at least one of the one or more downlink waveforms. For example, according to some aspects, the first waveform may be selected based, at least in part, on power consumption associated with the first waveform.

In some aspects, the selected waveform may be selected, e.g., by a base station, based, at least in part, on information included in a report that provides an indication of one or more downlink waveforms supported by the UE. For example, according to some aspects, the selected waveform may be selected based on any information disclosed above with respect to FIG. 3 that may be included in the aforementioned single report. In other words, in some aspects, the selected waveform may be selected based on at least one of the indication of the one or more downlink waveforms supported by the UE, the indication of the power consumption associated with at least one of the one or more downlink waveforms, or the indication of the performance associated with at least one of the one or more downlink waveforms. For example, according to some aspects, the selected waveform may be selected based, at least in part, on power consumption associated with the first waveform.

According to some aspects, the first waveform may be selected based, at least in part, on one or more parameters associated with the downlink wireless communication. In some aspects, the one or more parameters associated with the downlink wireless communication may include a channel dispersion parameter that may provide an indication of channel dispersion associated with the channel used for the downlink wireless communication. In additional aspects, the one or more parameters associated with the downlink wireless communication may include a velocity parameter that may provide an indication of velocity associated with the downlink wireless communication. According to some aspects, the one or more parameters associated with the downlink wireless communication may include a time alignment parameter that may provide an indication of timing mismatch associated with the downlink wireless communication. In some aspects, the one or more parameters associated with the downlink wireless communication may include a phase noise parameter that may provide an indication of the resiliency of a waveform to phase noise. According to some aspects, the one or more parameters associated with the downlink wireless communication may include a non-linearity parameter that may provide an indication of non-linearity correction that can be achieved when a particular waveform is used. In some aspects, the one or more parameters associated with the downlink wireless communication may include a power amplifier power reduction parameter that may provide an indication of an amount of non-linearity to be expected during downlink wireless communication. According to additional aspects, the one or more parameters associated with the downlink wireless communication may include a number of communication streams, such as a rank value that is indicative of a number of communication streams used at the same time for the downlink wireless communication. In some additional aspects, the one or more parameters associated with the downlink wireless communication may include an indication of a base station associated with the downlink wireless communication, e.g., as a result of a handover between base stations. According to additional aspects, the one or more parameters associated with the downlink wireless communication may include an indication of a beam associated with the downlink wireless communication. According to some aspects, the one or more parameters associated with the downlink wireless communication may include at least one of the aforementioned parameters.

In some aspects, the selected waveform may be selected based, at least in part, on another one or more parameters associated with the downlink wireless communication. For example, the other one or more parameters associated with the downlink wireless communication may include a channel dispersion parameter. In additional aspects, the other one or more parameters associated with the downlink wireless communication may include a rank indication (RI) request. In some aspects, the other one or more parameters associated with the downlink wireless communication may include a SINR parameter. According to some aspects, the other one or more parameters associated with the downlink wireless communication may include an integrated phase noise parameter. In some additional aspects, the other one or more parameters associated with the downlink wireless communication may include a number of mobile devices in a same spatial area, such as a number of devices supported or serviced by a base station. According to some aspects, the other one or more parameters associated with the downlink wireless communication may include an indication of a base station associated with the downlink wireless communication. According to some additional aspects, the other one or more parameters associated with the downlink wireless communication may include an indication of a beam associated with the downlink wireless communication. According to additional aspects, the other one or more parameters associated with the downlink wireless communication may include a battery status indication associated with a battery of the UE. In some aspects, the other one or more parameters associated with the downlink wireless communication may include at least one of the aforementioned parameters. In general, the other one or more parameters associated with the downlink wireless communication may also include one or more of most of the parameters reported by a UE. For example, some parameters reported by a UE may include a quasi-colocation (QCL) parameter, a SINR parameter, and/ or a RSRP parameter.

According to some aspects, the request to use the first waveform during the first time period for downlink wireless communication may be transmitted by a UE, e.g., to a base station, in response to the UE detecting a change in the downlink wireless communication or in response to the UE determining that the change occurred. For example, the change may indicate that a new waveform should be used for downlink communication. In some aspects, the change in the downlink wireless communication may include a change in a channel dispersion associated with the downlink wireless communication. According to some aspects, the change in channel dispersion may be measured using any one or more of various reference signals, such as a demodulation reference signal (DMRS), a channel state information reference signal (CSI-RS), a phase tracking reference signal (PTRS), a sounding reference signal (SRS), and/or other well-known reference signals. In additional aspects, the change in the downlink wireless communication may include a change in a velocity associated with the downlink wireless communication. In some additional aspects, the change in the downlink wireless communication may include a change in a time alignment associated with the downlink wireless communication. According to some aspects, the change in the downlink wireless communication may include a change in a number of communication streams associated with the downlink wireless communication. According to additional aspects, the change in the downlink wireless communication may include a change in a base station associated with the downlink wireless communication. In some aspects, the change in the downlink wireless communication may include a change in a beam associated with the downlink wireless communication. According to some aspects, the change in the downlink wireless communication may include a change in at least one of the aforementioned changes.

In some aspects, the request to use the first waveform during the first time period for downlink wireless communication may be transmitted by a UE, e.g., to a base station, in response to the UE detecting a change in a battery status associated with a battery of the UE or in response to the UE determining that the battery status change occurred. As an example, a UE may transmit the request when the UE determines that its battery power or energy is below a battery threshold.

According to some aspects, a UE may transmit, e.g., to a base station, the request as part of one or more RRC messages. In additional aspects, a UE may also transmit the request in a variety of additional ways. For example, a UE may transmit the request using uplink control information (UCI), a PUSCH, channel state feedback (CSF), and/or other well-known messaging schemes.

In some aspects, a base station may transmit, e.g., to a UE, the response as part of one or more RRC messages. In additional aspects, a base station may also transmit the response in a variety of additional ways. For example, a base station may transmit the response using downlink control information (DCI), a PDSCH, and/or other well-known messaging schemes.

According to some aspects, a UE may receive, e.g., from a base station, information based, at least in part, on the response that includes the indication of the selected waveform to use during the first time period for the downlink wireless communication. For example, the UE and base station may use the selected waveform to perform downlink wireless communication.

In some aspects, the request, e.g., as shown at block 402, may be included in a first report. According to some aspects, the first report may be referred to as a UE waveform report. In some aspects, a UE may transmit, e.g., to a base station, the UE waveform report.

According to some aspects, the response, e.g., as shown at block 404, may be included in a second report. According to some aspects, the second report may be referred to as a base station waveform report. In some aspects, a base station may transmit, e.g., to a UE, the base station waveform report.

Figure 5:
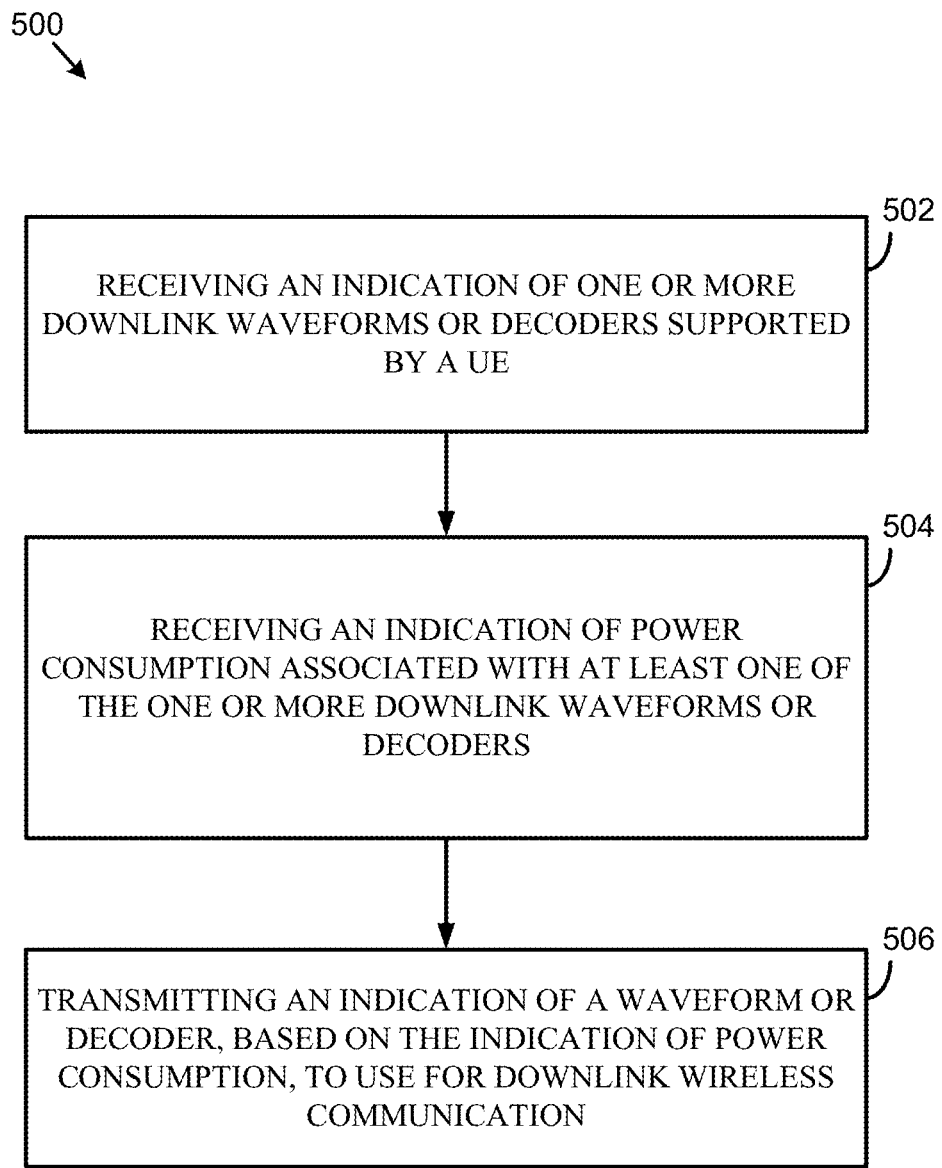
FIG. 5 is a diagram illustrating another method for dynamic utilization of multiple waveforms and/or multiple decoders for downlink wireless communication according to some aspects of the present disclosure.

FIG. 5, as another example, shows a diagram illustrating another method for dynamic utilization of multiple waveforms and/or multiple decoders for downlink wireless communication according to some aspects of the present disclosure. Aspects of method 500 may be implemented with various other aspects of this disclosure described with respect to FIGS. 1-2, 6-8, and 10, such as a base station/ gNB. For example, with reference to FIG. 2, controller/ processor 240 of base station 105 may control base station 105 to perform method 500.

FIG. 5 illustrates a method 500 that may be performed by a base station, such as a base station 105. At block 502, a base station, such as base station 105, may receive, e.g., from a UE, an indication of one or more downlink waveforms or decoders supported by the UE. At block 504, a base station may receive, e.g., from a UE, an indication of power consumption associated with at least one of the one or more downlink waveforms or decoders. At block 506, a base station may transmit, e.g., to a UE, an indication of a waveform or decoder, based on the indication of power consumption, to use for downlink wireless communication.

Figure 6:
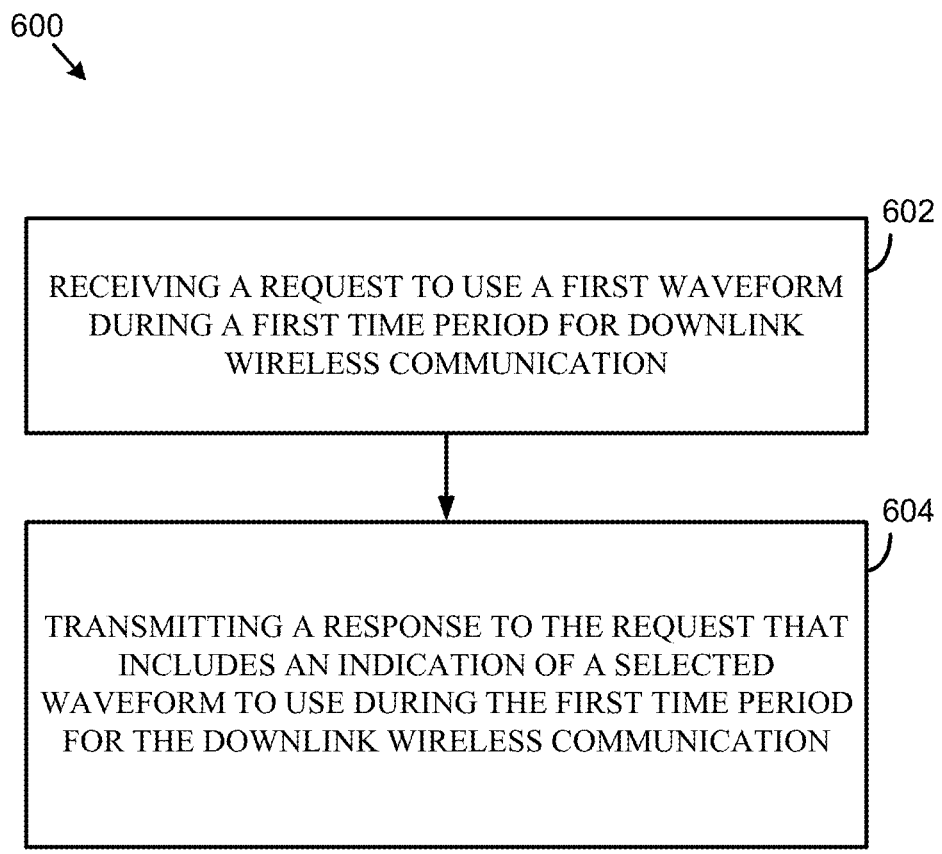
FIG. 6 is a diagram illustrating another method for dynamic selection and use of a waveform for downlink wireless communication according to some aspects of the present disclosure.

FIG. 6, as another example, shows a diagram illustrating another method for dynamic selection and use of a waveform for downlink wireless communication according to some aspects of the present disclosure. Aspects of method 600 may be implemented with various other aspects of this disclosure described with respect to FIGS. 1-2, 5, 7-8, and 10, such as a base station/gNB. For example, with reference to FIG. 2, controller/processor 240 of base station 105 may control base station 105 to perform method 600.

FIG. 6 illustrates a method 600 that may be performed by a base station, such as a base station 105. At block 602, a base station, such as base station 105, may receive, e.g., from a UE, a request to use a first waveform during a first time period for downlink wireless communication. At block 604, the base station may transmit, e.g., to the UE, a response to the request that includes an indication of a selected waveform to use during the first time period for the downlink wireless communication.

Figure 7:
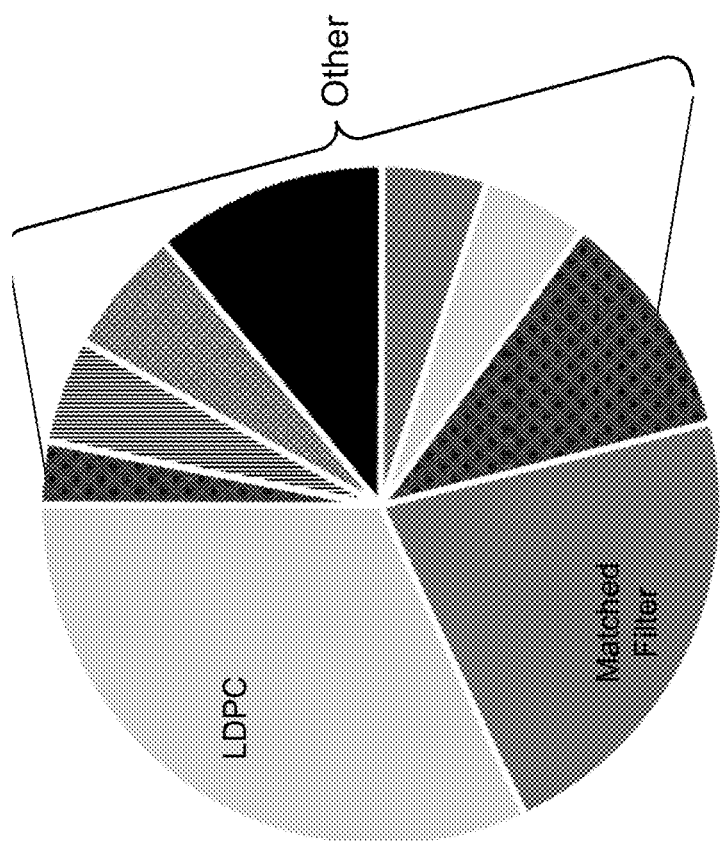
FIG. 7 is a diagram illustrating an example comparison of power consumption associated with two different waveforms according to some aspects of the present disclosure.
Figure 7:
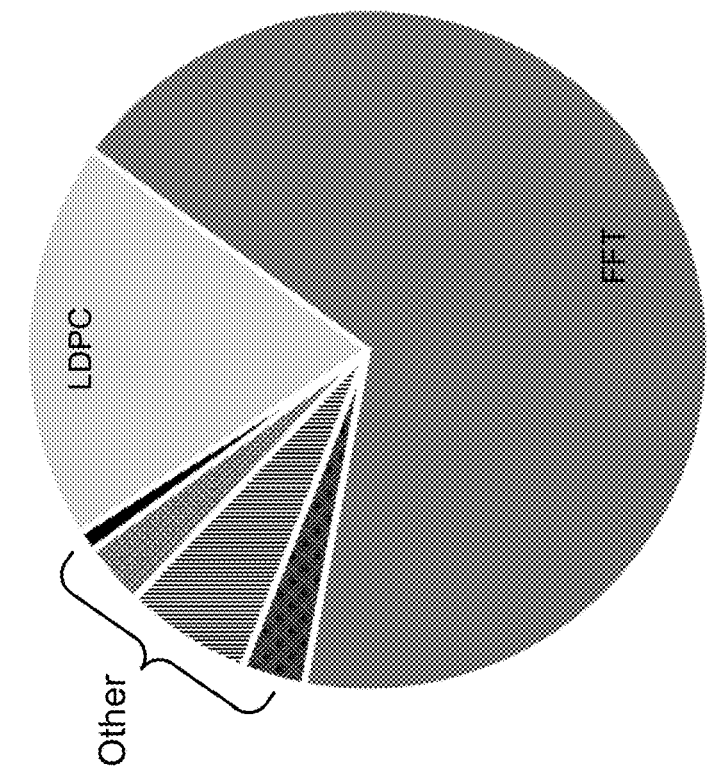

FIG. 7 is a diagram illustrating an example comparison of power consumption associated with two different waveforms according to some aspects of the present disclosure. In particular, FIG. 7 shows a distribution of power consumption for various DFE components and/or baseband processing components of a UE when the UE utilizes an OFDM-based waveform for downlink wireless communication. FIG. 7 also shows another distribution of power consumption for various DFE components and/or baseband processing components of the UE when the UE utilizes a single-carrier-based waveform for downlink wireless communication. In the examples illustrated in FIG. 7, although not shown, the power consumption associated with the OFDM-based waveform is approximately twice the power consumption associated with the single-carrier-based waveform. As shown in FIG. 7, the FFT associated with the OFDM-based waveform consumes more than half of the digital power consumption associated with the OFDM-based waveform. In other words, the LDPC and some of the other digital components may consume less power than what is needed for the FFT. Accordingly, in some downlink wireless communication scenarios, it may be more power efficient for a UE to utilize a waveform that does not require an FFT, such as a single-carrier-based waveform.

Figure 8:
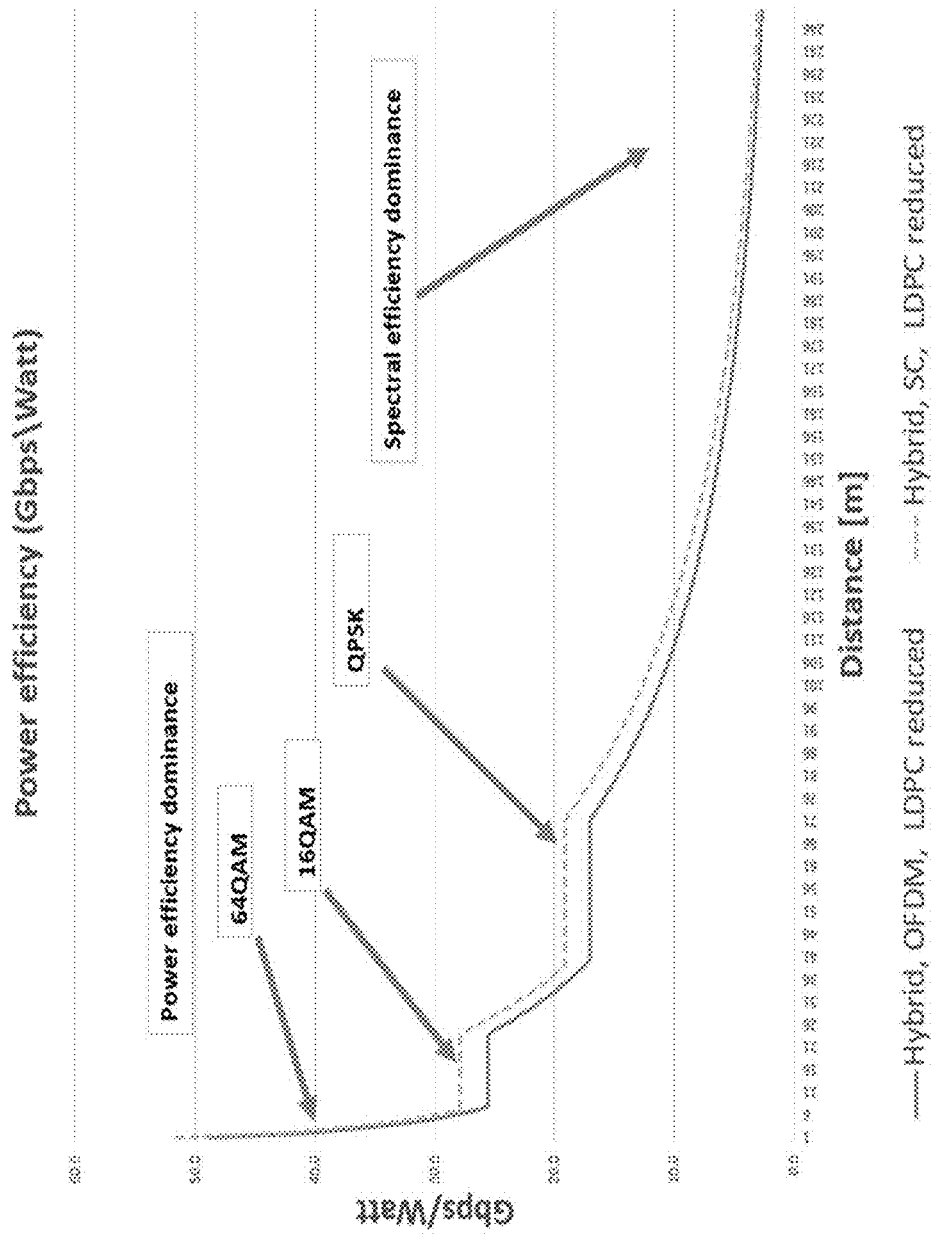
FIG. 8 is diagram illustrating an example comparison of performance and power associated with two different waveforms according to some aspects of the present disclosure.

FIG. 8 is diagram illustrating an example comparison of performance and power associated with two different waveforms according to some aspects of the present disclosure. In particular, FIG. 8 shows a power efficiency curve, e.g., Gbps/Watt, of a UE when the UE utilizes an OFDM-based waveform for downlink wireless communication. FIG. 8 also shows another power efficiency curve of a UE when the UE utilizes a single-carrier-based waveform for downlink wireless communication. As illustrated in FIG. 8, in close distances, power consumption may be a more dominant parameter than performance for both types of waveforms. Accordingly, in close distances, focusing on reducing power may be an effective strategy for improving the overall UE power efficiency. FIG. 8 also shows that in some downlink wireless communication scenarios, e.g., in the presence of a relatively flat channel, a single-carrier-based waveform may yield better power efficiency than an OFDM-based waveform. Accordingly, in some downlink wireless communication scenarios, a single-carrier-based waveform may be used to reduce UE power consumption and enhance throughput to yield an overall better power efficiency.

Figure 9:
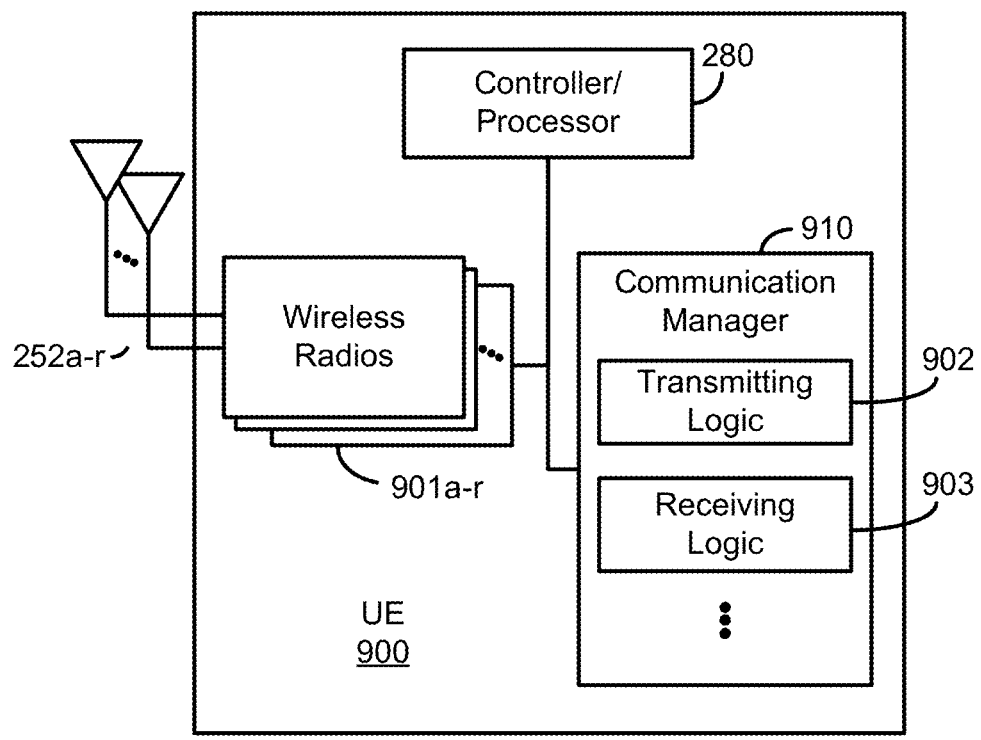
FIG. 9 is a block diagram conceptually illustrating a design of a UE configured according to some aspects of the present disclosure.

FIG. 9 shows a block diagram conceptually illustrating a design of a UE configured according to some aspects of the present disclosure. UE 900 may be configured to perform operations, including the blocks of the methods 300 and 400 described with reference to FIGS. 3 and 4. In some implementations, the UE 900 includes the structure, hardware, and components shown and described with reference to the UE 115 of FIGS. 1 and/or 2. For example, the UE 900 includes the controller 280, which operates to execute logic or computer instructions illustrated in communication manager 910, as well as controlling the components of the UE 900 that provide the features and functionality of the UE 900. The UE 900, under control of the controller 280, transmits and receives signals via wireless radios 901a-r and the antennas 252a-r. The wireless radios 901a-r include various components and hardware, as illustrated in FIG. 2 for the UE 115, including the modulator and demodulators 254a-r, the MIMO detector 256, the receive processor 258, the transmit processor 264, and the TX MIMO processor 266.

Communication Manager 910 may include Transmitting Logic 902 and Receiving Logic 903. Portions of one or more of the components 902 and 903 may be implemented at least in part in hardware or software. In some implementations, at least one of the components 902 and 903 is implemented at least in part as software stored in a memory (such as memory 282). For example, portions of one or more of the components 902 and 903 can be implemented as non-transitory instructions or code executable by a processor (such as the controller 280) to perform the functions or operations of the respective component.

One or more of the components 902 and 903 illustrated in Communication Manager 910 may configure processor/controller 280 to carry out one or more procedures relating to wireless communication by the UE 900, as previously described. For example, Transmitting Logic 902 may configure controller/processor 280 to carry out operations that include transmitting an indication of one or more downlink waveforms or decoders supported by the UE, in any manner previously described, such as with reference to block 302 (see FIG. 3). Additionally, Transmitting Logic 902 may configure controller/processor 280 to carry out operations that include transmitting an indication of power consumption associated with at least one of the one or more downlink waveforms or decoders, in any manner previously described, such as with reference to block 304 (see FIG. 3). Transmitting Logic 902 may also configure controller/processor 280 to carry out operations that include transmitting, to a base station, a request to use a first waveform during a first time period for downlink wireless communication, in any manner previously described, such as with reference to block 402 (see FIG. 4). In addition, Receiving Logic 903 may configure controller/processor 280 to carry out operations that include receiving an indication of a waveform or decoder, based on the indication of power consumption, to use for downlink wireless communication, in any manner previously described, such as with reference to block 306 (see FIG. 3). Additionally, Receiving Logic 903 may configure controller/processor 280 to carry out operations that include receiving, from the base station, a response to the request that includes an indication of a selected waveform to use during the first time period for the downlink wireless communication, in any manner previously described, such as with reference to block 404 (see FIG. 4). The UE 900 may receive signals from or transmit signals to one or more network entities, such as the base station 105 of FIGS. 1-2 or a base station as illustrated in FIG. 10.

Figure 10:
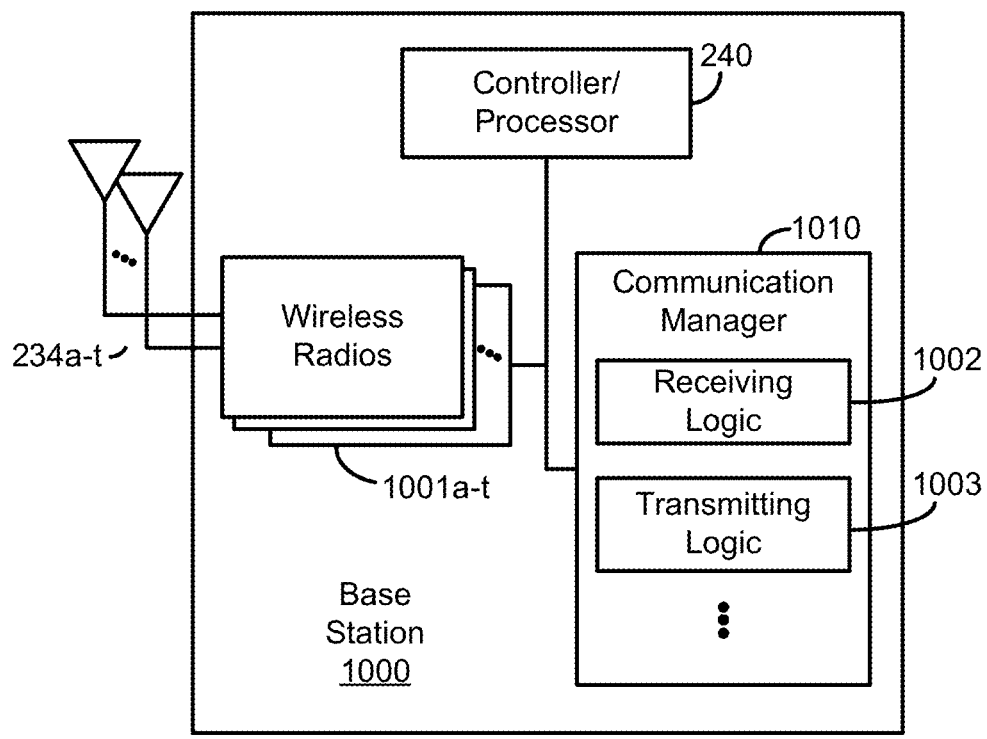
FIG. 10 is a block diagram conceptually illustrating a design of a base station (e.g., a gNB) configured according to some aspects of the present disclosure.

FIG. 10 shows a block diagram conceptually illustrating a design of a base station (e.g., a gNB) configured according to some aspects of the present disclosure. The base station 1000 may be configured to perform operations, including the blocks of the methods 500 and 600 described with reference to FIGS. 5 and 6. In some implementations, the base station 1000 includes the structure, hardware, and components shown and described with reference to the base station 105 of FIGS. 1-2. For example, the base station 1000 may include the controller 240, which operates to execute logic or computer instructions illustrated in communication manager 1010, as well as controlling the components of the base station 1000 that provide the features and functionality of the base station 1000. The base station 1000, under control of the controller 240, transmits and receives signals via wireless radios 1001*a-t* and the antennas 234*a-t*. The wireless radios 1001*a-t* include various components and hardware, as illustrated in FIG. 2 for the base station 105, including the modulator and demodulators 232*a-t*, the transmit processor 220, the TX MIMO processor 230, the MIMO detector 236, and the receive processor 238.

Communication Manager 1010 may include Receiving Logic 1002 and Transmitting Logic 1003. Portions of one or more of component 1002 and 1003 may be implemented at least in part in hardware or software. In some implementations, at least one of components 1002 and 1003 is implemented at least in part as software stored in a memory (such as memory 242). For example, portions of one or more of components 1002 and 1003 can be implemented as non-transitory instructions or code executable by a processor (such as the controller 240) to perform the functions or operations of the respective component.

One or more of components 1002 and 1003 illustrated in Communication Manager 1010 may configure processor/controller 240 to carry out one or more procedures relating to wireless communication by the base station 1000, as previously described. For example, Receiving Logic 1002 may configure controller/processor 240 to carry out operations that include receiving an indication of one or more downlink waveforms or decoders supported by a UE, in any manner previously described, such as with reference to block 502 (see FIG. 5). Additionally, Receiving Logic 1002 may configure controller/processor 240 to carry out operations that include receiving an indication of power consumption associated with at least one of the one or more downlink waveforms or decoders, in any manner previously described, such as with reference to block 504 (see FIG. 5). Receiving Logic 1002 may also configured controller/processor 240 to carry out operations that include receiving, from a UE, a request to use a first waveform during a first time period for downlink wireless communication, in any manner previously described, such as with reference to block 602 (see FIG. 6). In addition, Transmitting Logic 1003 may configure controller/processor 240 to carry out operations that include transmitting an indication of a waveform or decoder, based on the indication of power consumption, to use for downlink wireless communication, in any manner previously described, such as with reference to block 506 (see FIG. 5). Transmitting Logic 1003 may also configure controller/processor 240 to carry out operations that include transmitting, to the UE, a response to the request that includes an indication of a selected waveform to use during the first time period for the downlink wireless communication, in any manner previously described, such as with reference to block 604 (see FIG. 6). The base station 1000 may receive signals from or transmit signals to one or more UEs, such as the UE 115 of FIGS. 1-2 or the UE as illustrated in FIG. 9.

It is noted that one or more blocks (or operations) described with reference to FIGS. 3-6 may be combined with one or more blocks (or operations) described with reference to another of the figures. For example, one or more blocks (or operations) of FIG. 3 may be combined with one or more blocks (or operations) of FIGS. 4, 5 and/or 6. As another example, one or more blocks associated with FIG. 9 or 10 may be combined with one or more blocks (or operations) associated with FIG. 1 or 2.

In some aspects, techniques for supporting, selecting, and using multiple waveforms and/or multiple decoders for downlink wireless communication may include a UE transmitting an indication of one or more downlink waveforms or decoders supported by the UE. Techniques for supporting, selecting, and using multiple waveforms and/or multiple decoders for downlink wireless communication may also include the UE transmitting an indication of power consumption associated with at least one of the one or more downlink waveforms or decoders. Techniques for supporting, selecting, and using multiple waveforms and/or multiple decoders for downlink wireless communication may further include the UE receiving an indication of a waveform or decoder, based on the indication of power consumption, to use for downlink wireless communication.

Techniques for supporting, selecting, and using multiple waveforms and/or multiple decoders for downlink wireless communication may include additional aspects, such as any single aspect or any combination of aspects described below and/or in connection with one or more other processes described elsewhere herein.

In a first aspect, a UE may transmit an indication of performance associated with at least one of the one or more downlink waveforms. According to some aspects, the received indication may be based on the indication of the performance associated with the at least one of the one or more downlink waveforms.

In a second aspect, alone or in combination with the first aspect, a UE may transmit an indication of performance associated with at least one of the one or more decoders. According to some aspects, the received indication may be based on the indication of the performance associated with the at least one of the one or more decoders.

In a third aspect, alone or in combination with one or more of the first and second aspects, at least one of the indication of the power consumption associated with the at least one of the one or more downlink waveforms or decoders, the indication of the performance associated with the at least one of the one or more downlink waveforms, or the indication of the performance associated with the at least one of the one or more decoders may be associated with at least one of a flat wireless communication channel or a fading wireless communication channel.

In a fourth aspect, alone or in combination with one or more of the first through third aspects, the indication of the one or more downlink waveforms supported by the UE may indicate the one or more downlink waveforms supported by the UE for only one of downlink communication of data or downlink communication of control information.

In a fifth aspect, alone or in combination with one or more of the first through fourth aspects, the indication of the one or more decoders supported by the UE may indicate the one or more decoders supported by the UE for only one of downlink communication of data or downlink communication of control information.

In a sixth aspect, alone or in combination with one or more of the first through fifth aspects, the indication of the power consumption associated with the at least one of the one or more downlink waveforms may include an indication of power consumed by each of one or more components of the UE for each of the at least one of the one or more downlink waveforms.

In a seventh aspect, alone or in combination with one or more of the first through sixth aspects, a same hardware of the UE may be used to support each of the one or more downlink waveforms for the downlink wireless communication.

In an eighth aspect, alone or in combination with one or more of the first through seventh aspects, a UE may receive information based, at least in part, on the indication of the waveform or decoder to use for the downlink wireless communication.

In a ninth aspect, alone or in combination with one or more of the first through eighth aspects, the same hardware of the UE may be used to receive the information irrespective of which of the one or more downlink waveforms is indicated by the indication of the waveform or decoder to use for the downlink wireless communication.

In a tenth aspect, alone or in combination with one or more of the first through ninth aspects, a single report may include at least one of the indication of the one or more downlink waveforms or decoders supported by the UE or the indication of the power consumption associated with the at least one of the one or more downlink waveforms or decoders.

In an eleventh aspect, alone or in combination with one or more of the first through tenth aspects, a UE may transmit the single report during a connection establishment messaging session.

In a twelfth aspect, alone or in combination with one or more of the first through eleventh aspects, a UE may receive the indication of the waveform or decoder to use for the downlink wireless communication during the connection establishment messaging session.

In a thirteenth aspect, alone or in combination with one or more of the first through twelfth aspects, a UE may transmit an indication of a waveform and decoder pair to be used for the downlink wireless communication when a parameter associated with the downlink wireless communication is greater than a threshold for that parameter.

In some additional aspects, techniques for supporting, selecting, and using multiple waveforms and/or multiple decoders for downlink wireless communication may also include a UE transmitting a request to use a first waveform during a first time period for downlink wireless communication. Techniques for supporting, selecting, and using multiple waveforms and/or multiple decoders for downlink wireless communication may also include the UE receiving a response to the request that includes an indication of a selected waveform to use during the first time period for the downlink wireless communication.

In a fourteenth aspect, alone or in combination with one or more of the first aspect through the thirteenth aspect, the first waveform may be selected based, at least in part, on power consumption associated with the first waveform.

In a fifteenth aspect, alone or in combination with one or more of the first aspect through the fourteenth aspect, the first waveform may be selected based, at least in part, on one or more parameters associated with the downlink wireless communication.

In a sixteenth aspect, alone or in combination with one or more of the first aspect through the fifteenth aspect, the one or more parameters associated with the downlink wireless communication may include at least one of: a channel dispersion parameter; a velocity parameter; a time alignment parameter; a phase noise parameter; a non-linearity parameter; a power amplifier power reduction parameter; a number of communication streams; an indication of a base station associated with the downlink wireless communication; or an indication of a beam associated with the downlink wireless communication.

In a seventeenth aspect, alone or in combination with one or more of the first aspect through the sixteenth aspect, the selected waveform may be based, at least in part, on power consumption associated with the first waveform.

In an eighteenth aspect, alone or in combination with one or more of the first aspect through the seventeenth aspect, the selected waveform may be based, at least in part, on another one or more parameters associated with the downlink wireless communication.

In a nineteenth aspect, alone or in combination with one or more of the first aspect through the eighteenth aspect, the other one or more parameters may include at least one of: a channel dispersion parameter; a Rank Indication (RI) request; a signal to interference plus noise ratio (SINR) parameter; an integrated phase noise (IPN) parameter; a number of mobile devices in a same spatial area; an indication of a base station associated with the downlink wireless communication; an indication of a beam associated with the downlink wireless communication; or a battery status indication associated with a battery of the UE.

In a twentieth aspect, alone or in combination with one or more of the first aspect through the nineteenth aspect, a UE may transmit the request in response to detecting a change in the downlink wireless communication.

In a twenty-first aspect, alone or in combination with one or more of the first aspect through the twentieth aspect, the change in the downlink wireless communication may include a change in at least one of: a channel dispersion associated with the downlink wireless communication; a velocity associated with the downlink wireless communication; a time alignment associated with the downlink wireless communication; a number of communication streams associated with the downlink wireless communication; a base station associated with the downlink wireless communication; or a beam associated with the downlink wireless communication.

In a twenty-second aspect, alone or in combination with one or more of the first aspect through the twenty-first aspect, a UE may transmit the request in response to detecting a change in a battery status associated with a battery of the UE.

In a twenty-third aspect, alone or in combination with one or more of the first aspect through the twenty-second aspect, the selected waveform may be the first waveform or a different waveform.

In a twenty-fourth aspect, alone or in combination with one or more of the first aspect through the twenty-third aspect, a UE may transmit an indication of the first time period to the base station, wherein the first time period indication may include a parameter that specifies a number of slots during which the UE requests use of the first waveform.

In some aspects, techniques for supporting, selecting, and using multiple waveforms and/or multiple decoders for downlink wireless communication may include a base station receiving an indication of one or more downlink waveforms or decoders supported by a UE. Techniques for supporting, selecting, and using multiple waveforms and/or multiple decoders for downlink wireless communication may also include the base station receiving an indication of power consumption associated with at least one of the one or more downlink waveforms or decoders. Techniques for supporting, selecting, and using multiple waveforms and/or multiple decoders for downlink wireless communication may further include the base station transmitting an indication of a waveform or decoder, based on the indication of power consumption, to use for downlink wireless communication.

Techniques for supporting, selecting, and using multiple waveforms and/or multiple decoders for downlink wireless communication may include additional aspects, such as any single aspect or any combination of aspects described below and/or in connection with one or more other processes described elsewhere herein.

In a twenty-fifth aspect, a base station may receive an indication of performance associated with at least one of the one or more downlink waveforms. According to some aspects, the indication of the waveform to use for the downlink wireless communication may be transmitted based, at least in part, on the received indication of the performance associated with the at least one of the one or more downlink waveforms.

In a twenty-sixth aspect, alone or in combination with the twenty-fifth aspect, a base station may receive an indication of performance associated with at least one of the one or more decoders. According to some aspects, the indication of the decoder to use for the downlink wireless communication may be transmitted based, at least in part, on the received indication of the performance associated with the at least one of the one or more decoders.

In a twenty-seventh aspect, alone or in combination with one or more of the twenty-fifth aspect through the twenty-sixth aspect, at least one of the indication of the power consumption associated with the at least one of the one or more downlink waveforms or decoders, the indication of the performance associated with the at least one of the one or more downlink waveforms, or the indication of the performance associated with the at least one of the one or more decoders may be associated with at least one of a flat wireless communication channel or a fading wireless communication channel.

In a twenty-eighth aspect, alone or in combination with one or more of the twenty-fifth aspect through the twenty-seventh aspect, the indication of the one or more downlink waveforms supported by the UE may indicate the one or more downlink waveforms supported by the UE for only one of downlink communication of data or downlink communication of control information.

In a twenty-ninth aspect, alone or in combination with one or more of the twenty-fifth aspect through the twenty-eighth aspect, the indication of the one or more decoders supported by the UE may indicate the one or more decoders supported by the UE for only one of downlink communication of data or downlink communication of control information.

In a thirtieth aspect, alone or in combination with one or more of the twenty-fifth aspect through the twenty-ninth aspect, the indication of the power consumption associated with the at least one of the one or more downlink waveforms may include an indication of power consumed by each of one or more components of the UE for each of the at least one of the one or more downlink waveforms.

In a thirty-first aspect, alone or in combination with one or more of the twenty-fifth aspect through the thirtieth aspect, a single report may include at least one of the indication of the one or more downlink waveforms or decoders supported by the UE, or the indication of the power consumption associated with the at least one of the one or more downlink waveforms or decoders.

In a thirty-second aspect, alone or in combination with one or more of the twenty-fifth aspect through the thirty-first aspect, a base station may receive the single report during a connection establishment messaging session.

In a thirty-third aspect, alone or in combination with one or more of the twenty-fifth aspect through the thirty-second aspect, a base station may transmit the indication of the waveform or decoder to use for the downlink wireless communication during the connection establishment messaging session.

In a thirty-fourth aspect, alone or in combination with one or more of the twenty-fifth aspect through the thirty-third aspect, a base station may receive an indication of a waveform and decoder pair to be used for the downlink wireless communication when a parameter associated with the downlink wireless communication is greater than a threshold for that parameter.

In some additional aspects, techniques for supporting, selecting, and using multiple waveforms and/or multiple decoders for downlink wireless communication may also include a base station receiving a request to use a first waveform during a first time period for downlink wireless communication. Techniques for supporting, selecting, and using multiple waveforms and/or multiple decoders for downlink wireless communication may also include the base station transmitting a response to the request that includes an indication of a selected waveform to use during the first time period for the downlink wireless communication.

In a thirty-fifth aspect, alone or in combination with one or more of the twenty-fifth aspect through the thirty-fourth aspect, the first waveform may be based, at least in part, on power consumption associated with the first waveform.

In a thirty-sixth aspect, alone or in combination with one or more of the twenty-fifth aspect through the thirty-fifth aspect, the first waveform may be based, at least in part, on one or more parameters associated with the downlink wireless communication.

In a thirty-seventh aspect, alone or in combination with one or more of the twenty-fifth aspect through the thirty-sixth aspect, the one or more parameters associated with the downlink wireless communication may include at least one of: a channel dispersion parameter; a velocity parameter; a time alignment parameter; a phase noise parameter; a non-linearity parameter; a power amplifier power reduction parameter; a number of communication streams; an indication of one or more base stations associated with the downlink wireless communication; or an indication of a beam associated with the downlink wireless communication.

In a thirty-eighth aspect, alone or in combination with one or more of the twenty-fifth aspect through the thirty-seventh aspect, the selected waveform may be selected based, at least in part, on power consumption associated with the first waveform.

In a thirty-ninth aspect, alone or in combination with one or more of the twenty-fifth aspect through the thirty-eighth aspect, the selected waveform may be selected based, at least in part, on another one or more parameters associated with the downlink wireless communication.

In a fortieth aspect, alone or in combination with one or more of the twenty-fifth aspect through the thirty-ninth aspect, the other one or more parameters include at least one of: a channel dispersion parameter; a Rank Indication (RI) request; a signal to interference plus noise ratio (SINR) parameter; an integrated phase noise (IPN) parameter; a number of mobile devices in a same spatial area; an indication of one or more base stations associated with the downlink wireless communication; an indication of a beam associated with the downlink wireless communication; or a battery status indication associated with a battery of the UE.

In a forty-first aspect, alone or in combination with one or more of the twenty-fifth aspect through the fortieth aspect, a base station may receive the request in response to a change in the downlink wireless communication.

In a forty-second aspect, alone or in combination with one or more of the twenty-fifth aspect through the forty-first aspect, the change in the downlink wireless communication includes a change in at least one of: a channel dispersion associated with the downlink wireless communication; a velocity associated with the downlink wireless communication; a time alignment associated with the downlink wireless communication; a number of communication streams associated with the downlink wireless communication; one or more base stations associated with the downlink wireless communication; or a beam associated with the downlink wireless communication.

In a forty-third aspect, alone or in combination with one or more of the twenty-fifth aspect through the forty-second aspect, a base station may receive the request in response to a change in a battery status associated with a battery of the UE.

In a forty-fourth aspect, alone or in combination with one or more of the twenty-fifth aspect through the forty-third aspect, the selected waveform may be the first waveform or a different waveform.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a user equipment (UE), the method comprising:
   transmitting, to a base station, an indication of multiple types of downlink waveforms or multiple types of decoders supported by the UE;
   transmitting, to the base station, power consumption values associated with the multiple types of downlink waveforms or the multiple types of decoders; and
   receiving, from the base station, an indication of a selected type of waveform from the multiple types of downlink waveforms or a selected type of decoder from the multiple types of decoders, based on at least one of the power consumption values, to use for downlink wireless communication.

2. The method of claim 1, further comprising:
   transmitting an indication of performance associated with at least one of the multiple types of downlink waveforms, wherein the received indication of the selected type of waveform is based on the indication of the performance associated with the at least one of the multiple types of downlink waveforms.

3. The method of claim 2, further comprising:
   transmitting an indication of performance associated with at least one of the multiple types of decoders, wherein the received indication of the selected type of waveform is based on the indication of the performance associated with the at least one of the multiple types of decoders.

4. The method of claim 3, wherein at least one of the power consumption values, the indication of the performance associated with the at least one of the multiple types of downlink waveforms, or the indication of the performance associated with the at least one of the multiple types of decoders is associated with at least one of a flat wireless communication channel or a fading wireless communication channel.

5. The method of claim 1, wherein the indication of the multiple types of downlink waveforms supported by the UE indicates a type of downlink waveform supported by the UE for only one of downlink communication of data or downlink communication of control information.

6. The method of claim 1, wherein the indication of the multiple types of decoders supported by the UE indicates a type of decoder supported by the UE for only one of downlink communication of data or downlink communication of control information.

7. The method of claim 1, wherein the power consumption values include an indication of power consumed by each of one or more components of the UE for each of the multiple types of downlink waveforms.

8. The method of claim 1, wherein a same hardware of the UE is used to support each of the multiple types of downlink waveforms for the downlink wireless communication.

9. The method of claim 8, further comprising:
receiving information based, at least in part, on the indication of the selected type of waveform or the selected type of decoder to use for the downlink wireless communication.

10. The method of claim 9, wherein the same hardware of the UE is used to receive the information irrespective of which of the multiple types of downlink waveforms is indicated by the indication of the selected type of waveform or the selected type of decoder to use for the downlink wireless communication.

11. The method of claim 1, wherein a single report includes the indication of the multiple types of downlink waveforms or the multiple types of decoders supported by the UE and the power consumption values.

12. The method of claim 11, further comprising transmitting the single report to the base station during a connection establishment messaging session.

13. The method of claim 12, further comprising receiving the indication of the selected type of waveform or the selected type of decoder to use for the downlink wireless communication during the connection establishment messaging session.

14. The method of claim 1, further comprising transmitting an indication of a waveform and decoder pair to be used for the downlink wireless communication based on a parameter associated with the downlink wireless communication being greater than a threshold for that parameter.

15. A user equipment (UE), comprising:
at least one processor; and
a memory coupled to the at least one processor,
wherein the at least one processor is configured to:
transmit an indication of multiple types of downlink waveforms or multiple types of decoders supported by the UE;
transmit power consumption values associated with the multiple types of downlink waveforms or the multiple types of decoders; and
receive an indication of a selected type of waveform from the multiple types of downlink waveforms or a selected type of decoder from the multiple types of decoders, based on at least one of the power consumption values, to use for downlink wireless communication.

16. The UE of claim 15, wherein the at least one processor is further configured to:
transmit, during a connection establishment messaging session, a single report that includes the indication of the multiple types of downlink waveforms or the multiple types of decoders supported by the UE and the power consumption values; and
receive the indication of the selected type of waveform or the selected type of decoder to use for the downlink wireless communication during the connection establishment messaging session.

17. The UE of claim 15, wherein the at least one processor is further configured to:
receive information based, at least in part, on the indication of the selected type of waveform or the selected type of decoder to use for the downlink wireless communication, wherein a same hardware of the UE is used to receive the information irrespective of which of the multiple types of downlink waveforms is indicated by the indication of the selected type of waveform or the selected type of decoder to use for the downlink wireless communication.

18. The UE of claim 15, wherein the power consumption values include an indication of power consumed by each of one or more components of the UE for each of the multiple types of downlink waveforms.

19. The UE of claim 15, wherein the at least one processor is further configured to transmit an indication of a waveform and decoder pair to be used for the downlink wireless communication based on a parameter associated with the downlink wireless communication being greater than a threshold for that parameter.

20. A method for wireless communication performed by a base station, the method comprising:
receiving an indication of multiple types of downlink waveforms or multiple types of decoders supported by a user equipment (UE);
receiving power consumption values associated with the multiple types of downlink waveforms or the multiple types of decoders; and
transmitting, to the UE, an indication of a selected type of waveform from the multiple types of downlink waveforms or a selected type of decoder from the multiple types of decoders, based on at least one of the power consumption values, to use for downlink wireless communication.

21. The method of claim 20, further comprising:
receiving an indication of performance associated with at least one of the multiple types of downlink waveforms, wherein the indication of the selected type of waveform to use for the downlink wireless communication is transmitted based, at least in part, on the received indication of the performance associated with the at least one of the multiple types of downlink waveforms.

22. The method of claim 21, further comprising:
receiving an indication of performance associated with at least one of the multiple types of decoders, wherein the indication of the selected type of decoder to use for the downlink wireless communication is transmitted based, at least in part, on the received indication of the performance associated with the at least one of the multiple types of decoders.

23. The method of claim 22, wherein at least one of the power consumption values, the indication of the performance associated with the at least one of the multiple types of downlink waveforms, or the indication of the performance associated with the at least one of the multiple types of decoders is associated with at least one of a flat wireless communication channel or a fading wireless communication channel.

24. The method of claim 20, wherein the indication of the multiple types of downlink waveforms supported by the UE indicates a type of downlink waveform supported by the UE for only one of downlink communication of data or downlink communication of control information.

25. The method of claim 20, wherein the indication of the multiple types of decoders supported by the UE indicates a type of decoder supported by the UE for only one of downlink communication of data or downlink communication of control information.

26. The method of claim 20, wherein the power consumption values include an indication of power consumed by each of one or more components of the UE for each of the multiple types of downlink waveforms.

27. The method of claim 20, wherein a single report includes the indication of the multiple types of downlink waveforms or the multiple types of decoders supported by the UE, and the power consumption values.

28. The method of claim 27, further comprising:
receiving, from the UE, the single report during a connection establishment messaging session; and
transmitting, to the UE, the indication of the selected type of waveform or the selected type of decoder to use for the downlink wireless communication during the connection establishment messaging session.

29. The method of claim 20, further comprising receiving an indication of a waveform and decoder pair to be used for the downlink wireless communication based on a parameter associated with the downlink wireless communication being greater than a threshold for that parameter.

30. A base station, comprising:
at least one processor; and
a memory coupled to the at least one processor,
wherein the at least one processor is configured to:
receive an indication of multiple types of downlink waveforms or multiple types of decoders supported by a user equipment (UE);
receive power consumption values associated with the multiple types of downlink waveforms or the multiple types of decoders; and
transmit an indication of a selected type of waveform from the multiple types of downlink waveforms or a selected type of decoder from the multiple types of decoders, based on at least one of the power consumption values, to use for downlink wireless communication.

31. The method of claim 1, wherein the indication of the multiple types of downlink waveforms or the multiple types of decoders supported by the UE indicates support for at least one of an OFDM waveform, a single-carrier waveform, a SC-FDMA waveform, or a CDMA waveform;
wherein transmitting the power consumption values comprises transmitting an indication of power consumption associated with the at least one of the OFDM waveform, the single-carrier waveform, the SC-FDMA waveform, or the CDMA waveform; and
wherein receiving the indication of the selected type of waveform or the selected type of decoder comprises receiving an indication of the OFDM waveform, the single-carrier waveform, the SC-FDMA waveform, or the CDMA waveform.

32. The method of claim 1, wherein the indication of the multiple types of downlink waveforms or the multiple types of decoders supported by the UE indicates support for at least one of a low-density parity-check (LDPC) decoder, a Reed-Solomon decoder, a multilevel coding (MLC) decoder, a Bose-Chaudhuri-Hocquenghem (BCH) decoder, a Viterbi decoder, a polar code-based decoder, or a turbo code-based decoder;
wherein transmitting the power consumption values comprises transmitting an indication of power consumption associated with the at least one of the LDPC decoder, the Reed-Solomon decoder, the MLC decoder, the BCH decoder, the Viterbi decoder, the polar code-based decoder, or the turbo code-based decoder; and
wherein receiving the indication of the selected type of waveform or the selected type of decoder comprises receiving an indication of the LDPC decoder, the Reed-Solomon decoder, the MLC decoder, the BCH decoder, the Viterbi decoder, the polar code-based decoder, or the turbo code-based decoder.

33. The UE of claim 15, wherein the indication of the multiple types of downlink waveforms or the multiple types of decoders supported by the UE indicates support for at least one of an OFDM waveform, a single-carrier waveform, a SC-FDMA waveform, or a CDMA waveform;
wherein the at least one processor is configured to transmit the power consumption values by being configured to transmit an indication of power consumption associated with the at least one of the OFDM waveform, the single-carrier waveform, the SC-FDMA waveform, or the CDMA waveform; and
wherein the at least one processor is configured to receive the indication of the selected type of waveform or the selected type of decoder by being configured to receive an indication of the OFDM waveform, the single-carrier waveform, the SC-FDMA waveform, or the CDMA waveform.

34. The UE of claim 15, wherein the indication of the multiple types of waveforms or the multiple types of decoders supported by the UE indicates support for at least one of a low-density parity-check (LDPC) decoder, a Reed-Solomon decoder, a multilevel coding (MLC) decoder, a Bose-Chaudhuri-Hocquenghem (BCH) decoder, a Viterbi decoder, a polar code-based decoder, or a turbo code-based decoder;
wherein the at least one processor is configured to transmit the power consumption values by being configured to transmit an indication of power consumption associated with the at least one of the LDPC decoder, the Reed-Solomon decoder, the MLC decoder, the BCH decoder, the Viterbi decoder, the polar code-based decoder, or the turbo code-based decoder; and
wherein the at least one processor is configured to receive the indication of the selected type of waveform or the selected type of decoder by being configured to receive an indication of the LDPC decoder, the Reed-Solomon decoder, the MLC decoder, the BCH decoder, the Viterbi decoder, the polar code-based decoder, or the turbo code-based decoder.

35. The method of claim 1, wherein transmitting, to the base station, the power consumption values comprises transmitting a list or table to the base station that provides an individual power consumption value for each of the multiple types of downlink waveforms.

36. The method of claim 1, wherein transmitting, to the base station, the power consumption values comprises transmitting a list or table to the base station that provides an individual power consumption value for each of the multiple types of decoders.

* * * * *